United States Patent
Snively

(10) Patent No.: US 8,583,780 B2
(45) Date of Patent: Nov. 12, 2013

(54) DISCOVERY OF DUPLICATE ADDRESS IN A NETWORK BY REVIEWING DISCOVERY FRAMES RECEIVED AT A PORT

(75) Inventor: Robert Snively, Morgan Hill, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 721 days.

(21) Appl. No.: 12/272,096

(22) Filed: Nov. 17, 2008

(65) Prior Publication Data

US 2009/0132701 A1    May 21, 2009

Related U.S. Application Data

(60) Provisional application No. 60/989,418, filed on Nov. 20, 2007.

(51) Int. Cl.
*G06F 15/16*  (2006.01)
*G06F 15/173* (2006.01)
*G06F 15/177* (2006.01)

(52) U.S. Cl.
USPC .......................................... 709/224; 709/217

(58) Field of Classification Search
USPC ................................................ 709/217–228
See application file for complete search history.

(56) References Cited

U.S. PATENT DOCUMENTS

| | | | |
|---|---|---|---|
| 4,922,486 A | 5/1990 | Lidinsky et al. | |
| 5,090,011 A | 2/1992 | Fukuta et al. | |
| 5,115,433 A | 5/1992 | Baran et al. | |
| 5,251,205 A | 10/1993 | Callon et al. | |
| 5,274,631 A | 12/1993 | Bhardwaj | |
| 5,305,311 A | 4/1994 | Lyles | |
| 5,390,173 A | 2/1995 | Spinney et al. | |
| 5,805,805 A | 9/1998 | Civanlar et al. | |
| 5,894,481 A | 4/1999 | Book | |
| 5,905,873 A | 5/1999 | Hartmann et al. | |
| 5,996,024 A | 11/1999 | Blumenau | |
| 6,000,020 A | 12/1999 | Chin et al. | |
| 6,021,454 A | 2/2000 | Gibson | |
| 6,085,238 A | 7/2000 | Yuasa et al. | |
| 6,147,969 A | 11/2000 | Benmohamed et al. | |
| 6,278,532 B1 | 8/2001 | Heimendinger et al. | |
| 6,400,730 B1 | 6/2002 | Latif et al. | |
| 6,594,234 B1 | 7/2003 | Chard et al. | |
| 6,657,962 B1 | 12/2003 | Barri et al. | |
| 6,680,947 B1 * | 1/2004 | Denecheau et al. | 370/396 |
| 6,690,668 B1 | 2/2004 | Szczepanek et al. | |
| 6,738,821 B1 | 5/2004 | Wilson et al. | |

(Continued)

FOREIGN PATENT DOCUMENTS

WO    9836537 A1    8/1998

OTHER PUBLICATIONS

CD/9000 Channel Director—Product Detail by CNT, at http://web.archive.org/web/20050204044510/www.cnt.com/products/switching/cf9000, 2 pages, © 2003-2005, printed Jul. 19, 2006.

(Continued)

*Primary Examiner* — Haresh N Patel
(74) *Attorney, Agent, or Firm* — Wong, Cabello, Lutsch, Rutherford & Brucculeri, L.L.P.

(57) ABSTRACT

A duplicate address discovery process detects duplicate MAC addresses or duplicate unique port identifiers within the network, alerts attached devices of the duplicates, and takes action to avoid data corruption that might be caused by such duplicate addresses.

13 Claims, 6 Drawing Sheets

(56) References Cited

U.S. PATENT DOCUMENTS

| | | | |
|---|---|---|---|
| 6,742,090 B2 | 5/2004 | Sanada et al. | |
| 6,763,417 B2 | 7/2004 | Paul et al. | |
| 7,027,450 B2 | 4/2006 | Collette et al. | |
| 7,072,298 B2 | 7/2006 | Paul et al. | |
| 7,088,735 B1 | 8/2006 | Reohr, Jr. et al. | |
| 7,120,728 B2 | 10/2006 | Krakirian et al. | |
| 7,130,303 B2 | 10/2006 | Hadzic | |
| 7,133,416 B1 | 11/2006 | Chamdani et al. | |
| 7,145,914 B2 | 12/2006 | Olarig et al. | |
| 7,194,550 B1 | 3/2007 | Chamdani et al. | |
| 7,197,047 B2 | 3/2007 | Latif et al. | |
| 7,206,314 B2 | 4/2007 | Liao et al. | |
| 7,218,636 B2 | 5/2007 | Paul et al. | |
| 7,236,496 B2 | 6/2007 | Chung et al. | |
| 7,237,045 B2 | 6/2007 | Beckmann et al. | |
| 7,269,168 B2 | 9/2007 | Roy et al. | |
| 7,272,727 B2 * | 9/2007 | Mimatsu | 713/193 |
| 7,308,001 B2 | 12/2007 | Collette et al. | |
| 7,376,765 B2 | 5/2008 | Rangan et al. | |
| 7,433,351 B1 | 10/2008 | Pelissier et al. | |
| 7,453,810 B2 | 11/2008 | Zoranovic et al. | |
| 7,466,712 B2 | 12/2008 | Makishima et al. | |
| 7,529,851 B1 * | 5/2009 | Haley et al. | 709/245 |
| 7,583,681 B2 | 9/2009 | Green | |
| 7,616,637 B1 | 11/2009 | Lee et al. | |
| 7,770,208 B2 * | 8/2010 | Barnett et al. | 726/2 |
| 7,787,476 B2 * | 8/2010 | Shimizu et al. | 370/401 |
| 8,108,454 B2 * | 1/2012 | Snively et al. | 370/401 |
| 8,238,347 B2 * | 8/2012 | DeSanti et al. | 370/401 |
| 2002/0083285 A1 | 6/2002 | Sanada et al. | |
| 2003/0043742 A1 | 3/2003 | De Maria et al. | |
| 2003/0126297 A1 | 7/2003 | Olarig et al. | |
| 2003/0131105 A1 | 7/2003 | Czeiger et al. | |
| 2003/0202536 A1 | 10/2003 | Foster et al. | |
| 2004/0133570 A1 | 7/2004 | Soltis | |
| 2004/0213211 A1 * | 10/2004 | Green | 370/352 |
| 2005/0007951 A1 | 1/2005 | Lapuh et al. | |
| 2005/0157752 A1 | 7/2005 | Takase et al. | |
| 2005/0249247 A1 | 11/2005 | Shanley et al. | |
| 2005/0286551 A1 | 12/2005 | Berman | |
| 2006/0005076 A1 | 1/2006 | Brown et al. | |
| 2006/0034302 A1 * | 2/2006 | Peterson | 370/401 |
| 2006/0098572 A1 | 5/2006 | Zhang et al. | |
| 2006/0098589 A1 | 5/2006 | Kreeger | |
| 2006/0098681 A1 | 5/2006 | Cafiero | |
| 2006/0101140 A1 | 5/2006 | Gai | |
| 2006/0168155 A1 | 7/2006 | Pascasio et al. | |
| 2006/0203725 A1 | 9/2006 | Paul et al. | |
| 2006/0206579 A1 | 9/2006 | Connor et al. | |
| 2006/0251067 A1 * | 11/2006 | DeSanti et al. | 370/389 |
| 2007/0073882 A1 * | 3/2007 | Brown et al. | 709/226 |
| 2007/0201490 A1 | 8/2007 | Mahamuni | |
| 2007/0239989 A1 * | 10/2007 | Barnett et al. | 713/185 |
| 2007/0280207 A1 * | 12/2007 | Shimizu et al. | 370/353 |
| 2007/0288653 A1 | 12/2007 | Sargor et al. | |
| 2008/0010489 A1 * | 1/2008 | Kawamoto et al. | 714/4 |
| 2008/0028096 A1 * | 1/2008 | Henderson et al. | 709/236 |
| 2008/0126540 A1 * | 5/2008 | Zeng et al. | 709/225 |
| 2008/0205418 A1 * | 8/2008 | Rose et al. | 370/401 |
| 2009/0034522 A1 * | 2/2009 | Hayes et al. | 370/389 |
| 2009/0037977 A1 * | 2/2009 | Gai et al. | 726/1 |
| 2009/0052326 A1 * | 2/2009 | Bergamasco et al. | 370/236 |
| 2009/0052461 A1 | 2/2009 | Brown et al. | |
| 2009/0063706 A1 * | 3/2009 | Goldman et al. | 709/250 |
| 2009/0158081 A1 * | 6/2009 | Dake et al. | 714/3 |
| 2009/0268746 A1 | 10/2009 | Ogasahara et al. | |
| 2010/0325274 A1 * | 12/2010 | Saklecha et al. | 709/224 |

OTHER PUBLICATIONS

Cisco MDS 9000 Family Networked Storage Solutions for Small and Medium-Sized Businesses—At-a-Glance, 2 page product brochure, © 1992-2005 Cisco Systems, Inc.

Cisco MDS 9000 Family of Multilayer Directors and Fabric Switches, at http://www/cisco.com/en/US/products/ps6446/prod_brochure0900aecd80355d56.html, 3 pages, © 1992-2005, printed Jul. 19, 2006.

CNT Introduces New Generation Storage Networking Infrastructure, at http://web.archive.org/web/20050206034944/www.cnt.com/cnt/news/pr/2004/07-19-00, 3 pages, © 2003-2005, printed Jul. 19, 2006.

DStar: CNT Remains FICON Leader with UltraNet Multi-Service Director, at http://www.taborcommunications.com/dsstar/04/1109/109456.html, 2 pages, printed Jul. 19, 2006.

FC/9000 Fibre Channel/FICON Director—Product Detail by CNT, at http://web.archive.org/web/20050205081213/www.cnt.com/products/switching/fc9000, 3 pages, © 2003-2005, printed Jul. 19, 2006.

MCData—Intrepid 10000 Director, product brochure, 2 pages, 2006 McData Corporation, Dec. 31.

MCData—Intrepid 6140 Director, product brochure, 2 pages, 2006 McData Corporation, Dec. 31.

Mogul, J. et al., "IP MTU Discovery Options," RFC 1063, Jul. 1998, 11 pages.

Schroeder, Michael E. et al., "Autonet: a High-speed, Self-configuring Local Area Network Using Point-to-point Links," Digital Equipment Corporation, SRC Research Report 59, Apr. 21, 1990, 44 pages.

European Search Report prepared by the European Patent Office for EP Application No. 10 15 4286, dated May 28, 2010, 6 pages.

Lapuh, Roger et al., Split Multi-Link Trunking (SMLT) draft-lapuh-network-smlt-08, Internet Engineering Task Force, IETF; StandardWorkingDraft, Internet Society (ISOC) 4, Rue Des Falaises CH-1205, Geneva, Switzerland, No. 8, Jul. 7, 2008, XP015059390, 15 pages.

Claudio Desanti, Bob Nixon, Bob Snively, Silvano Gai, John Hufferd, Craig Carlson, Steve Wilson, Ed McGlaughlin, Dave Peterson; "T11/07-572v1 FCoE Discovery"; Nov. 9, 2007; pp. 1-41.

* cited by examiner

DISCOVERY OF DUPLICATE ADDRESS IN A NETWORK BY REVIEWING DISCOVERY FRAMES RECEIVED AT A PORT

This application claims the benefit pursuant to 35 U.S.C. 119(e) of U.S. provisional application No. 60/989,418 entitled "Duplicate Address Discovery and Action" filed on 20 Nov. 2007.

BACKGROUND

A storage area network (SAN) may be implemented as a high-speed, special purpose network that interconnects different kinds of data storage devices with associated data servers on behalf of a large network of users. Typically, a storage area network includes high performance switches as part of the overall network of computing resources for an enterprise. The storage area network is usually clustered in close geographical proximity to other computing resources, such as mainframe computers, but may also extend to remote locations for backup and archival storage using wide area network carrier technologies. Fibre Channel networking is typically used in SANs although other communications technologies may also be employed, including Ethernet and IP-based storage networking standards (e.g., iSCSI, FOP (Fibre Channel over IP), etc.).

As used herein, the term "Fibre Channel" refers to the Fibre Channel family of standards (developed by the American National Standards Institute (ANSI)) and other related and draft standards. In general, Fibre Channel defines a transmission medium based on a high speed communications interface for the transfer of large amounts of data via connections between varieties of hardware devices.

In a typical SAN, one or more Fibre Channel switches are used to communicatively connect one or more server devices with one or more data storage devices. Such switches generally support a high performance switching fabric and provide a number of communication ports for connecting to other switches, servers, storage devices, or other SAN devices. Other high performance fabrics may employ different fabric technologies, such as Infiniband.

Other networking technologies, such as Ethernet, may also be employed in communicating between computing and networking devices. However, these networking technologies do not work seamlessly with high performance networks, such as a Fibre Channel network. For example, duplicate media access controller (MAC) addresses within an Ethernet network can cause looping and misdirection of frames within the network, which can lead to data corruption in devices coupled to the high performance network.

SUMMARY

Implementations described and claimed herein address the foregoing problems by providing a method of detecting duplicate MAC addresses within the network, alerting attached devices of the duplicates, and taking action to avoid data corruption that might be caused by such duplicate MAC addresses.

Other implementations are also described and recited herein.

BRIEF DESCRIPTIONS OF THE DRAWINGS

DETAILED DESCRIPTIONS

Figure 1:
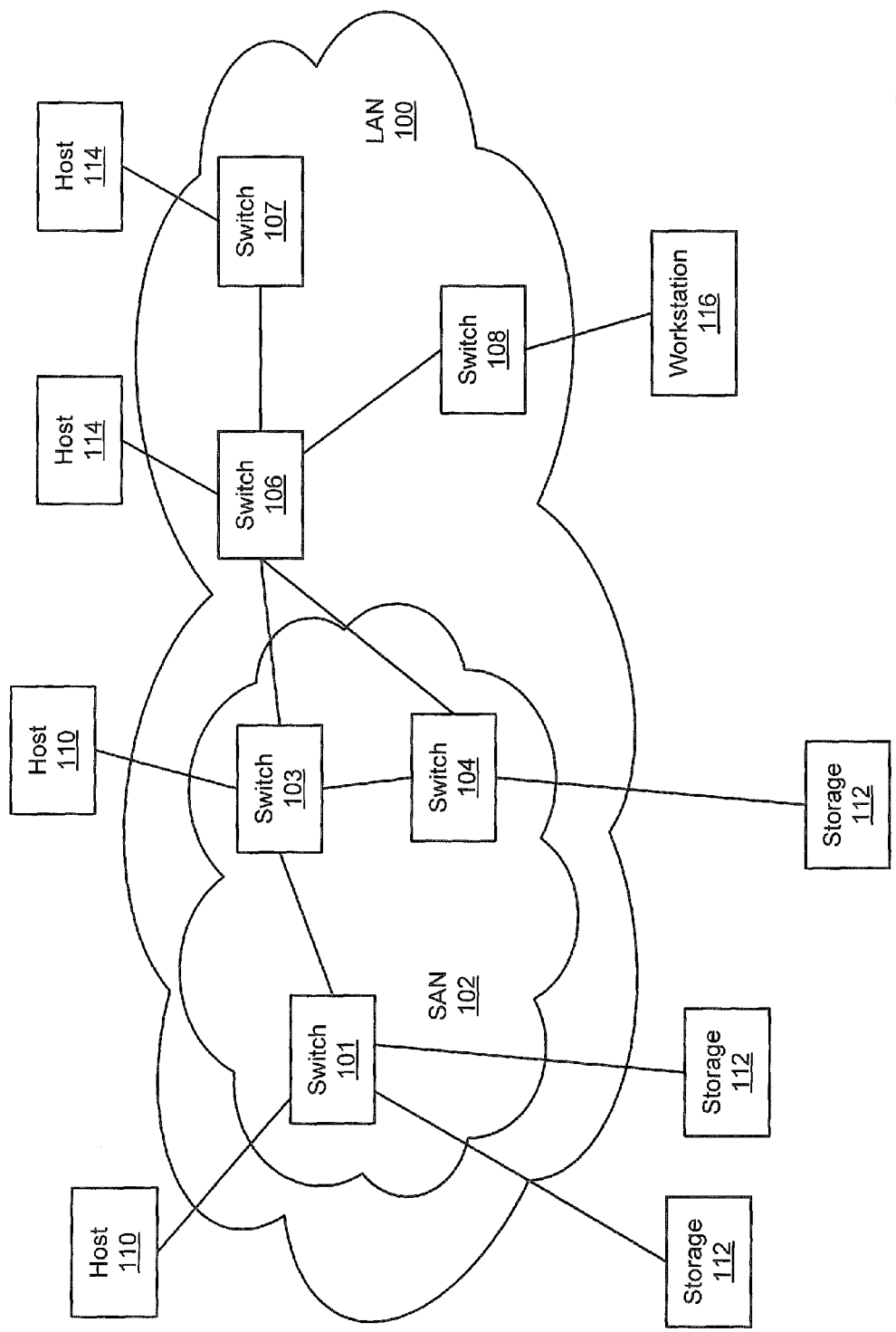
FIG. 1 illustrates an exemplary computing and storage framework including a local area network (LAN) and a storage area network (SAN).

FIG. 1 illustrates an exemplary computing and storage framework including a local area network (LAN) 100 and a storage area network (SAN) 102. A local area network (LAN) 100 provides communication connectivity among multiple devices, such as a workstation 116 and hosts 114. Connectivity within the LAN 100 is provided by switches 106, 107 and 108. The LAN 100 is presumed to be the network for a relevant enterprise with a number of different segments, although any LAN configuration may be employed.

A storage area network (SAN) 102 resides within the LAN 100 and provides communication connectivity, routing, and other SAN functionality among hosts 110 and storage units 112. The SAN 102 includes a number of switches, such as switches 101, 103 and 104. Such switches 103 and 104 may be configured as a set of blade components inserted into a chassis, as rackable or stackable modules, or as other device structures. In one implementation, the chassis has a back plane or mid-plane into which the various blade components, such as switching blades and control processor blades, may be inserted.

Two of the switches, i.e., switches 103 and 104, of the SAN 102 are connected within the LAN 102 via a switch 106. The switch 106 is also used to join other segments of the LAN 100, as represented by the other switches 107 and 108, which are also shown in the LAN 100. In addition, a series of hosts 110 are connected to various switches 104 in the SAN 102. Likewise storage units, such as described storage units 112, are connected also to various switches 104 in the SAN 102.

Various application clients, such as the workstation 116, are networked to application servers, such as the hosts 114, via the LAN 100. A user can access applications resident on the hosts 114 through the workstation 116. The applications may depend on data (e.g., an email database) stored at one or more of the storage units 112. Accordingly, in the illustrated example, the SAN 102 provides connectivity among the hosts 114, the workstation 116, and the application data storage devices 112 to allow the applications to access the data they need to operate.

The hosts 114 and switches 103 and 104 are configured to perform discovery operations that include detection of duplicate MAC addresses in the network 100. As a new host, workstation, switch (or the other devices, in some circumstances) is added to the network 100, it solicits other devices in the network in such as way as to allow the other devices to detect whether the new device is attempting to enter the network with a duplicate MAC address. It should be understood that aspects of the described technology may also apply to other types of addresses, particularly L2 addresses, within an arbitrary network.

Generally, a developing standard called Fibre Channel over Ethernet (FCOE) allows Fibre Channel (FC) frames to be transmitted and received over an Ethernet network. In one implementation, a standard FC frame is equipped with a specified FCoE header and embedded within an Ethernet frame for communication through the Ethernet network. When an FCoE frame is transmitted through the Ethernet network and reaches a properly equipped FC switch at the boundary of a SAN, the FC switch strips off the Ethernet and FCoE portions of the frame and forwards the embedded FC frame through the SAN. Likewise, when a standard FC frame is transmitted through the SAN and reaches a properly equipped FC switch at the boundary of the SAN and an Ethernet network, the FC switch adds an FCoE header and an Ethernet header (with appropriate synchronization fields) to the FC frame and forwards the newly-enhanced FCoE frame to the Ethernet network.

The Ethenet header of the FCoE frame includes source and destination L2 addresses, such as MAC addresses, which the Ethernet network uses to communicate the frame to its intended destination. For example, hosts and other devices on the Ethernet network can receive the FCoE frame if they are configured to receive frames having the MAC address in the destination field of the Ethernet header. Typically, each host or other device maintains a list of MAC addresses it is configured to receive. Such MAC addresses may be uni-cast addresses, multi-cast addresses, virtual addresses, etc.

In addition, each host or other device also has at least one MAC address that it inserts into the source L2 address field of any frame it transmits. The source address allows a receiving device to determine the sender of a frame and, therefore, destination address to which any reply should be sent. If multiple devices on the network are sending the same source address out in their respective frame transmissions, then devices that receive those frames may reply to such communications by setting the destination address in its reply to this duplicated address. Unfortunately, in an Ethernet network, it is possible that such duplication of destination addresses can cause a frame to loop endlessly within the network, never reaching its destination. Furthermore, a frame transmitted to a duplicated address may be received by the wrong host (e.g., the "other" host having the duplicate source address), which can corrupt data on that host.

Figure 2:
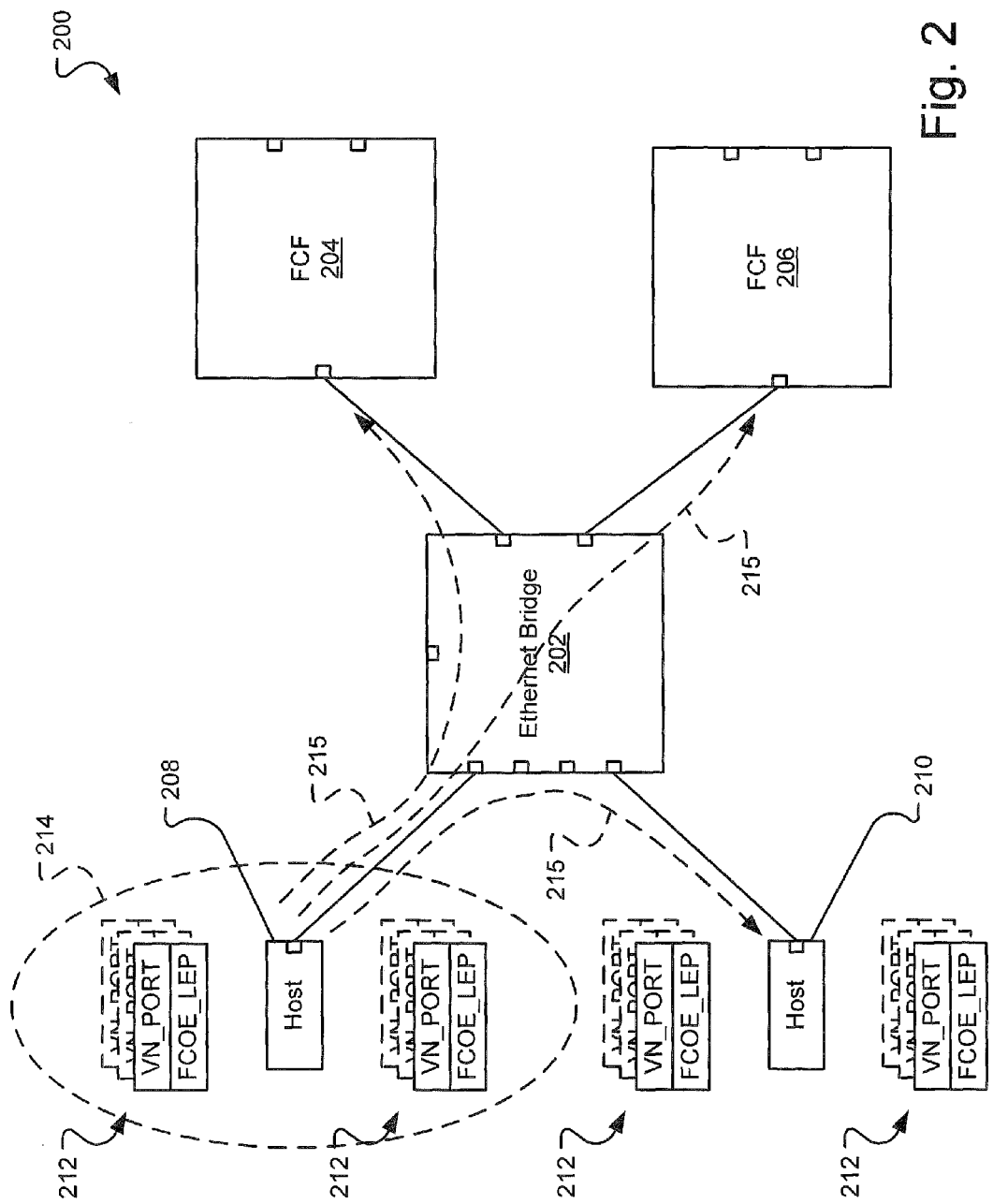
FIG. 2 illustrates a discovery operation in an example duplicate address discovery process.

FIG. 2 illustrates a solicitation operation in an example duplicate address discovery process. In a communications network 200, an Ethernet Bridge 202 couples Fibre Channel Forwarders (FCFs) 204 and 206 (e.g., Fibre Channel switches supporting FCOE) on the edge of a SAN with hosts 208 and 210. In one implementation, the Ethernet Bridge 202 may include capabilities of congestion management and baby jumbo frame support. Congestion management may include one or more of the following: Pause, Per Priority Pause, and/or additional congestion management protocol support.

The FCFs 204 and 206 are coupled to other switching elements within the SAN, which is capable of providing networked connectivity with other hosts and data storage devices. In the illustrated implementation, each host supports Fibre Channel over Ethernet (FCOE) and is capable of maintaining one or more virtual links, such as a virtual N_PORT (VN_PORT) to virtual F_PORT (VF_PORT) link, as designated by the FCOE Link End Point (FCOE_LEP) icons and VN_PORT icons shown at 212, and each FCF is capable of maintaining a virtual E_PORT (VE_PORT) to VE_PORT link. As such, the hosts 208 and 210 are capable of accessing the storage devices of the SAN through the bridge 202 and one or more of the FCFs 204 and 206 using an FCoE protocol.

In FIG. 2, the dashed oval 214 represents that the host 208 has not yet joined the network 200. Instead, it is attempting to join the network 200 through a sequence of signals and negotiations with other devices in the network 200. In one implementation, as an initial operation, the host 208 transmits via a transmitter a multi-cast solicitation frame addressed to all FCoE devices (shown in FIG. 2 as transmissions 215) in the network 200, so as to ensure that all FCoE-capable ports, both N_PORTs and E/F_PORTs, in the network 200 can receive the solicitation frame. The host 208 includes one of its MAC addresses as the source address in the solicitation frame. This MAC address may be a MAC address stored in a programmable read only memory (PROM) on the Ethernet adapter card connected to the network or a virtual MAC address allocated to the device in support of virtual devices maintained by the device.

In one implementation, the solicitation frame also includes a unique Port World Wide Name ("Port Name") for the port that is transmitting the solicitation frame. Generally, a Port Name uniquely identifies an FC port from any other existing FC port in existence, including any FCoE ports. As such, the Port Name may be used as a test point to identify duplicate MAC addresses in the network, even before the port's FC_ID is assigned in the fabric login (FLOGI process.

It should be understood that there are many different Port Names that may be associated with an FCoE host port. Some of these different Port Names may be created and assigned during subsequent discovery and login operations. Nevertheless, the Port Name used during the solicitation operation is characterized by uniqueness effective for identifying duplicate L2 addresses in the described process.

The solicitation frame is received by all FCoE-capable ports in the network, which respond in a manner similar to typical discovery processes—these ports respond with a uni-cast solicitation frame from host 210 and advertisements from FCFs 204 and 206. However, these receiving ports each include an evaluator that examines each solicitation/advertisement frame to detect possible L2 address duplication. If a receiving port discovers that (a) the source MAC address is a duplicate of its own and (b) the Port Name is not a duplicate of its own, the port identifies that a duplication condition exists with a duplicate MAC address in the network. Likewise, if the receiving port discovers that (a) the source MAC address is not a duplicate of its own but (b) the Port Name is a duplicate of its own, the port identifies that a duplication condition exists with a duplicate Port Name in the network. In contrast, if the receiving port discovers that if the port discovers that (a) the source MAC address is a duplicate of its own and (b) the Port Name is a duplicate of its own, then the port considers the frame to be a reflection of a frame it had previously transmitted and no duplication condition is detected.

If a duplication condition is determined to exist, the detecting port (i.e., the port that detected the duplication condition) announces the duplication condition to other FCoE devices in the network using a multi-cast alert frame transmitted via a transmitter. The alert frame may include the MAC address and/or Port Name associated with the duplication and warns other FCoE devices in the network that an incorrect configuration may exist. Such warning can then be posted to an administrator through typical administration mechanisms.

Furthermore, after transmitting the alert frame, the detecting port removes itself from the network (e.g., going offline to all actions) until the configuration error is administratively corrected and the port is given permission to re-enter the network. All other FCoE ports in the network except the detecting port may continue with normal discovery and begin normal operation, as the duplicate MAC of the detecting port is no longer online. Solicitation frames, advertisement frames, alert frames, and ARP frames are all included in the term "discovery frames" in this description.

In the illustration of FIG. 2, at least three example duplication conditions may be described. In a first example duplication condition, assume both the host 208 and the FCF 206 possess the same MAC address. As such, when the host 208 solicits the FCoE devices in the network, the FCF 206 detects a duplicate source MAC address in the solicitation frame to its own and further detects that the Port Name in the solicitation frame is not its own. Accordingly, the FCF 206 transmits, via a transmitter, a multi-cast alert frame to all FCoE devices in the network and goes offline until the duplication condition is corrected and the FCF 206 can be brought back online.

In a second example duplication condition, assume both the host 208 and the host 210 possess the same MAC address. As such, when the host 208 solicits the FCoE devices in the network, the host 210 detects a duplicate source MAC address in the solicitation frame to its own and further detects that the Port Name in the solicitation frame is not its own. Accordingly, the host 210 transmits a multi-cast alert frame to all FCoE devices in the network and goes offline until the duplication condition is corrected and the host 210 can be brought back online.

In yet a third example duplication condition, assume both the FCF 204 and the FCF 206 possess the same MAC address. This condition should be rare in that any duplication condition would normally have been detected and corrected when either FCF 204 or FCF 206 first entered the network 200. However, under certain timing conditions, this example condition is not entirely nonexistent.

When the host 208 in this third example solicits the FCoE devices in the network, both the FCF 204 and the FCF 206 do not detect a duplication condition from the solicitation operation. As such, both the FCF 204 and the FCF 206 both reply with an advertisement frame responsive to the solicitation frame. It should also be understood that other FCoE device in the network will also respond with advertisements or the equivalent.

Periodic multi-cast frames may also be transmitted to continuously monitor for the subsequent appearance of duplicate MAC addresses that may be generated at other than the original solicitation time. Duplicate address detection is then performed in the previously described manner.

In one implementation, the advertisement would be a jumbo Ethernet frame having a destination MAC address of the host 208, a source MAC address, and Port Name of the transmitting port of the individual FCF device. Other data contained in the advertisement frame may include FCF information, a priority designation, the switch name, the FC-MAP, the fabric name, etc.

Figure 3:
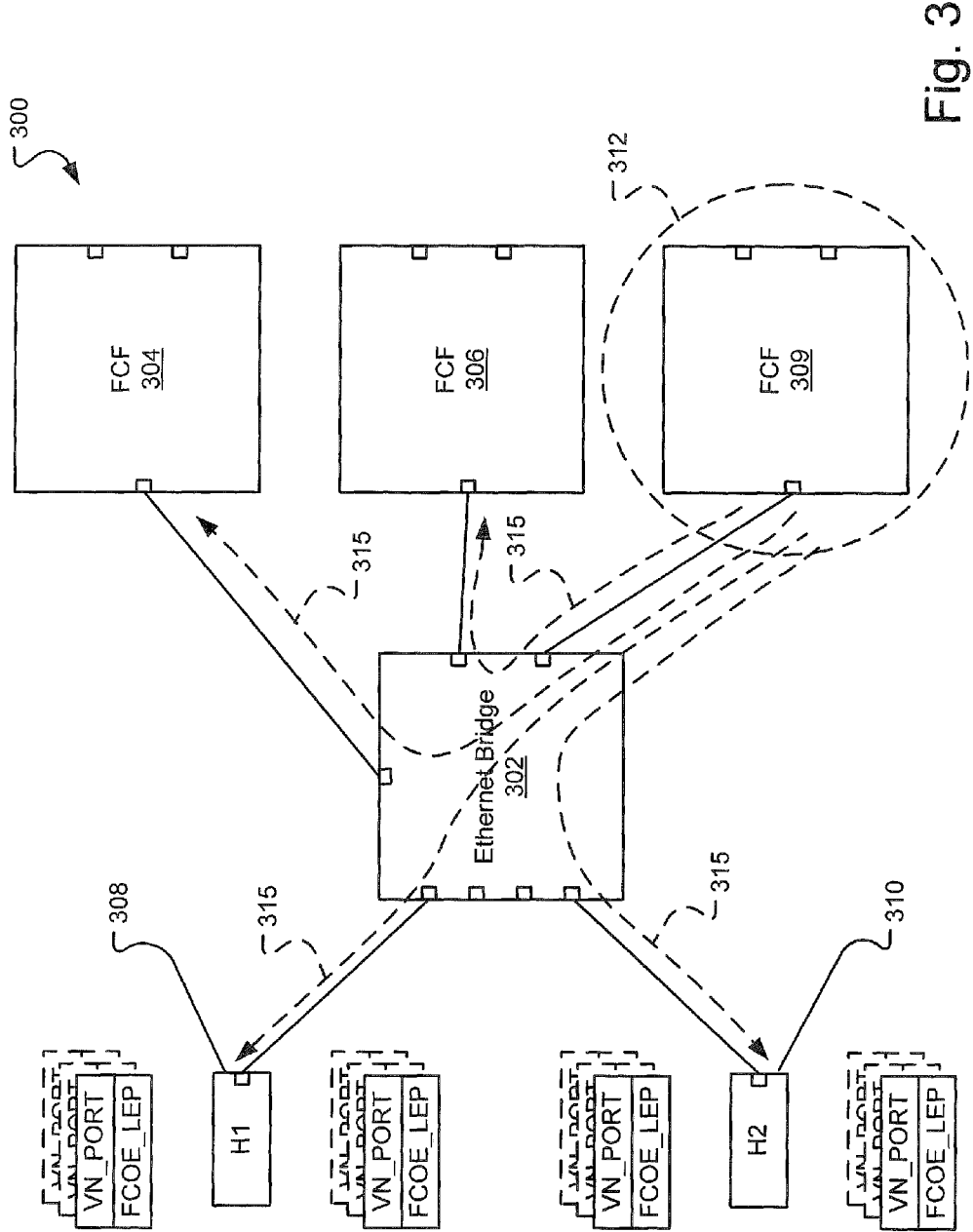
FIG. 3 illustrates an alternative discovery operation in an example duplicate address discovery process.

Upon receiving the advertisement from FCF 204 and FCF 206, as well as responses from other FCoE devices, the host 208 examines each response, looking for duplicate MAC addresses and/or Port Names. (Note: If both the MAC addresses and the Port Names match, then the host 208 considers the two advertisements to be from the same FCF, such that no duplicate condition is detected.) If a duplication condition is detected, the host 208 transmits a multi-cast alert frame to all FCoE devices in the network warning of the duplication condition. In this configuration, the FCF 204 and FCF 206 examine the alert flame and determine that they are part of the duplication condition. Accordingly, they post warnings to the administrator and go offline until the duplication condition is corrected and they can be brought back online FIG. 3 illustrates an alternative solicitation operation in an example duplicate address discovery process. The operation is comparable to the solicitation operation described with regard to FIG. 2, with some differences.

In a communications network 300, an Ethernet Bridge 302 couples Fibre Channel Forwarders (FCFs) 304, 306, and 309 on the edge of a SAN with hosts 308 and 310. In one implementation, the Ethernet Bridge 302 may include capabilities of congestion management and baby jumbo frame support. Congestion management may include one or more of the following: Pause, Per Priority Pause, and/or additional congestion management protocol support.

The FCFs 304, 306, and 309 are coupled to other switching elements within the SAN, which is capable of providing networked connectivity with other hosts and data storage devices. In the illustrated implementation, each host supports Fibre Channel over Ethernet (FCOE) and is capable of maintaining one or more virtual links, such as a virtual N_PORT (VN_PORT) to virtual F_PORT (VF_PORT) link, and each FCF is capable of maintaining a virtual E_PORT (VE_PORT) to VE_PORT link. As such, the hosts 308 and 310 are capable of accessing the storage devices of the SAN through the bridge 302 and one or more of the FCFs 304, 306, and 309 using an FCoE protocol.

In FIG. 3, the dashed oval 312 represents that the FCF 309 has not yet joined the network 300. Instead, it is attempting to join the network 300 through a sequence of signals and negotiations with other devices in the network 300. In one implementation, as an initial operation, the FCF 309 transmits a multi-cast advertisement frame addressed to all FCoE devices (shown in FIG. 3 as transmissions 315) in the network 300, so as to ensure that all FCoE-capable ports, both N_PORTs and E/F_PORTs, in the network 300 can receive the advertisement frame. The FCF 309 includes one of its MAC addresses as the source address in the advertisement frame. In addition, the advertisement frame also includes relevant information for typical FCoE discovery, such as the FC-MAP (if implemented), the fabric name, the switch name, a priority, etc.

In one implementation, the advertisement frame also includes a unique Port World Wide Name ("Port Name") for the port that is transmitting the advertisement frame. Generally, a Port Name uniquely identifies an FC port from any other existing FC port in existence, including any FCoE ports. As such, the Port Name may be used as a test point to identify duplicate MAC addresses in the network, even before the port's FC_ID is assigned in the FLOGI process.

The advertisement frame is received by all FCoE-capable ports in the network, which respond in a manner similar to typical discovery processes—these ports respond with a uni-cast solicitation frame from hosts 308 and 310 and advertisements from FCFs 304 and 306. However, these receiving ports also examine each solicitation or advertisement frame to detect possible L2 address duplication. If a receiving port discovers that (a) the source MAC address is a duplicate of its own and (b) the Port Name is not a duplicate of its own, the port identifies that a duplication condition exists with a duplicate MAC address in the network. Likewise, if the receiving port discovers that (a) the source MAC address is not a duplicate of its own but (b) the Port Name is a duplicate of its own, the port identifies that a duplication condition exists with a duplicate Port Name in the network. In contrast, if the receiving port discovers that if the port discovers that (a) the source MAC address is a duplicate of its own and (b) the Port Name is a duplicate of its own, then the port considers the frame to be a reflection of a frame it had previously transmitted and no duplication condition is detected.

If a duplication condition is determined to exist, the detecting port (i.e., the port that detected the duplication condition) announces the duplication condition to other FCoE devices in the network using a multi-cast alert frame. The alert frame may include the MAC address and/or Port Name associated with the duplication and warns other FCoE devices in the network that an incorrect configuration may exist. Such warning can then be posted to an administrator through typical administration mechanisms.

Furthermore, after transmitting the alert frame, the detecting port removes itself from the network (e.g., going offline to all actions) until the configuration error is administratively corrected and the port is given permission to re-enter the network. All other FCoE ports in the network except the detecting port may continue with normal discovery and begin normal operation, as the duplicate MAC of the detecting port is no longer online.

The three examples given with regard to FIG. 2 are also applicable to the configuration and scenario of FIG. 3.

Figure 4:
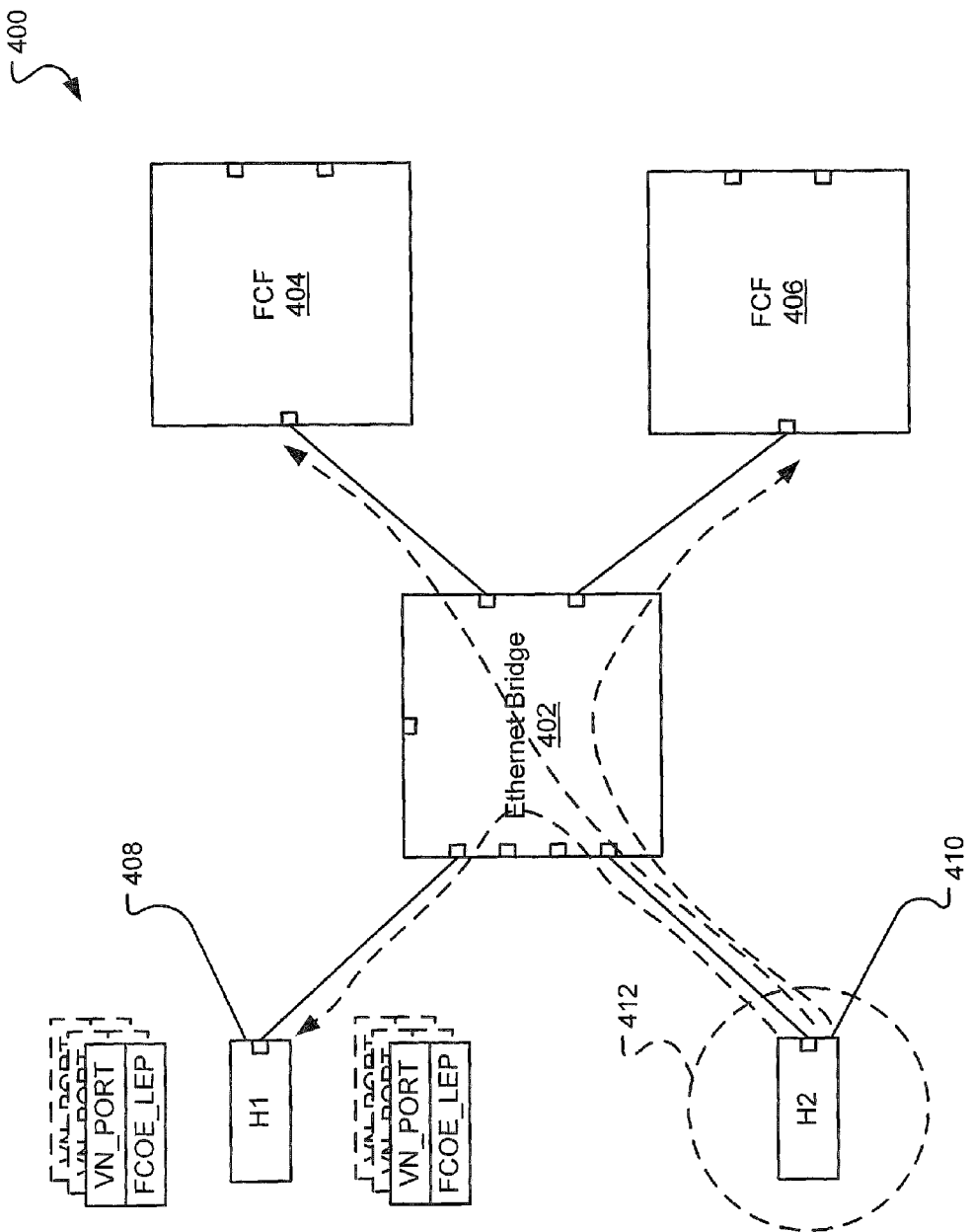
FIG. 4 illustrates an Address Resolution Protocol (ARP) operation in an example duplicate address discovery process.

FIG. 4 illustrates an Address Resolution Protocol (ARP) operation in an example duplicate address discovery process. The ARP operation performs a discovery process for non-FCoE devices coupled to an Ethernet network that supports FCoE. There is no defined response or advertisement for an FCoE device to generate in response to a request or announcement ARP frame. Accordingly, individual FCoE devices in the network are responsible for detecting duplicates responsive to an ARP request and taking action if a duplication condition is identified.

In a communications network 400, an Ethernet Bridge 402 couples Fibre Channel Forwarders (FCFs) 404 and 406 on the edge of a SAN with hosts 408 and 410. In one implementation, the Ethernet Bridge 402 may include capabilities of congestion management and baby jumbo frame support. Congestion management may include one or more of the following: Pause, Per Priority Pause, and/or additional congestion management protocol support.

The FCFs 404 and 406 are coupled to switching elements within the SAN, which is capable of providing networked connectivity with other hosts and data storage devices. In the illustrated implementation, the host 408 supports Fibre Channel over Ethernet (FCOE) and is capable of maintaining one or more virtual links, such as a virtual N_PORT (VN_PORT) to virtual F_PORT (VF_PORT) link, and each FCF is capable of maintaining a virtual E_PORT (VE_PORT) to VE_PORT link. As such, the FCoE host 408 is capable of accessing the storage devices of the SAN through the bridge 402 and one or more of the FCFs 204 and 206 using an FCoE protocol. In contrast, the host 410 represents a non-FCoE host.

In FIG. 4, the dashed oval 412 represents that the host 410 has not yet joined the network 400. Instead, it is attempting to join the network 400 through a sequence of signals and negotiations with other devices in the network 400. In one implementation, as an initial operation, the host 410 transmits an ARP frame addressed to all Ethernet devices (shown in FIG. 4 as transmissions 415) in the network 400, so as to ensure that all FCoE-capable ports, both N_PORTs and E/F_PORTs, in the network 400 can receive the ARP frame. The host 408 includes one of its MAC addresses as the source address in the ARP frame. This MAC address may be a MAC address stored in a PROM on the Ethernet adapter card connected to the network or a virtual MAC address allocated to the device in support of virtual devices maintained by the device.

All FCoE devices receiving the ARP frame examine the frame for a MAC source address that is identical to their own MAC address. Note: if the FCoE device maintains and monitors a table mapping IP address to MACs, the FCoE device can also identify MAC addresses duplicated among IP-only devices in the network. If an ARP frame with a MAC address that matches that of the receiving FCoE device is identified, then the receiving FCoE device determines that a duplication condition exists.

If a duplication condition is determined to exist, the detecting port (i.e., the port that detected the duplication condition) announces the duplication condition to other FCoE devices in the network using a multi-cast alert frame. The alert frame may include the MAC address and/or Port Name associated with the duplication and warns other FCoE devices in the network that an incorrect configuration may exist. Such warning can then be posted to an administrator through typical administration mechanisms.

Furthermore, after transmitting the alert frame, the detecting port removes itself from the network (e.g., going offline to all actions) if the MAC address is the same as that of the detecting port until the configuration error is administratively corrected and the port is given permission to reenter the network. All other FCoE ports in the network except the detecting port may continue with normal discovery and begin normal operation, as the duplicate MAC of the detecting port is no longer online.

FCoE devices may periodically emit multi-cast advertisement frames that may also be verified for duplicate MAC addresses as described above even after the initial discovery process is completed.

Figure 5:
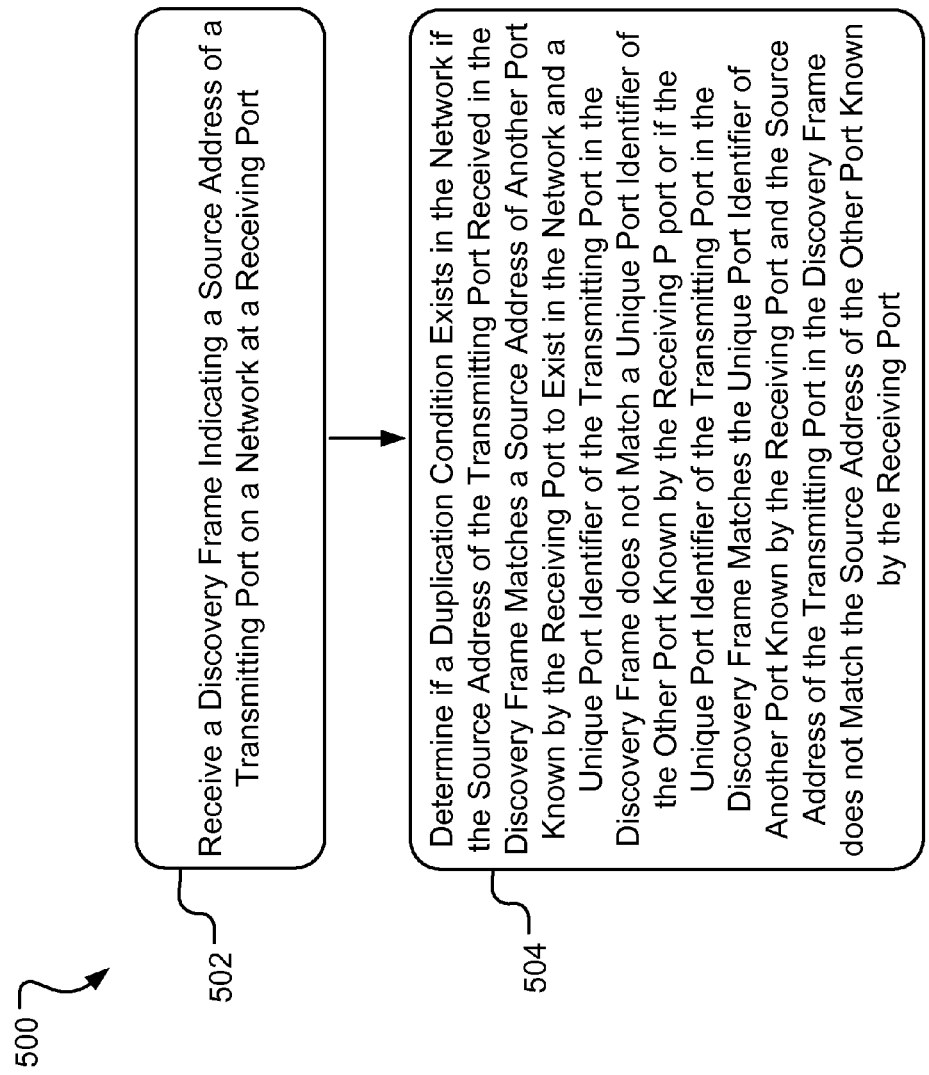
FIG. 5 is a flowchart illustrating an exemplary process for detecting an existence of duplicate addresses in an FCoE network.

FIG. 5 is a flowchart illustrating an exemplary process 500 for detecting an existence of duplicate addresses in an FCoE network. The exemplary process 500 may be carried out by any FCoE capable device, such as FCFs 204 and 206 and hosts 208 and 210 of FIG. 2; FCFs 304, 206, and 309 and hosts 308 and 310 of FIG. 3; FCFs 404 and 406 and hosts 408 and 410 of FIG. 4; or another device or module. In a receiving operation 502, a discovery frame indicating a source address of a transmitting port on a network is received at a receiving port. The source address may include an L2 address such as a MAC address and a unique Port World Wide Name or "Port Name" for the port that is transmitting the discovery frame. Further, the discovery frame may be a solicitation frame, advertisement frame, or alert. In a determining operation 504, the source address of the transmitting port received in the discovery frame is compared with the source address of another port known by the receiving port to exist in the network to determine whether the source addresses match. The another port known by the receiving port to exist in the network may be the receiving port itself. In an implementation, a duplication condition is determined to exist in the network if an L2 address of the transmitting port in the discovery frame matches an L2 address of the another port known by the receiving port and an unique port identifier of the transmitting port in the discovery frame does not match an unique port identifier of the another port known by the receiving port or if the unique port identifier of the transmitting port in the discovery frame matches the unique port identifier of the another port known by the receiving port and the L2 address of the transmitting port in the discovery frame does not match the L2 address of the another port known by the receiving port. If a duplication exists, other devices on the network may be alerted. Further, the other port known to the receiving port can be taken offline in response to the discovery of a duplicate address.

Figure 6:
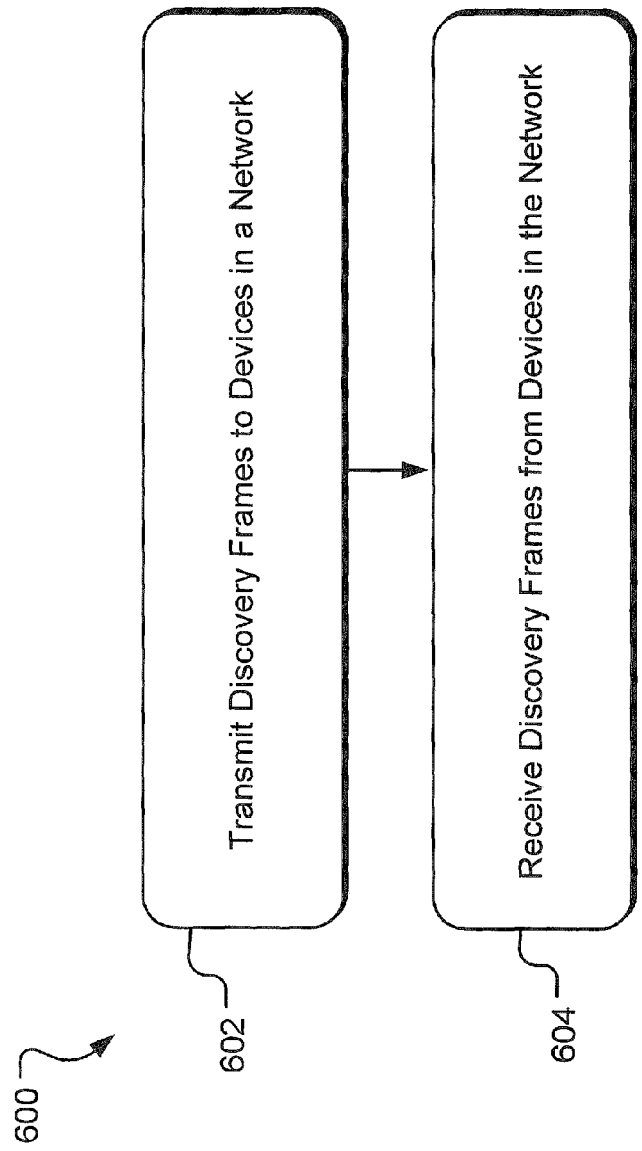
FIG. 6 is a flowchart illustrating an exemplary process for soliciting (FCoE) devices in a network.

FIG. 6 is a flowchart illustrating an exemplary process 600 for soliciting (FCOE) devices in a network. The exemplary process 600 may be carried out by any FCoE capable device, such as FCFs 204 and 206 and hosts 208 and 210 of FIG. 2; FCFs 304, 206, and 309 and hosts 308 and 310 of FIG. 3; FCFs 404 and 406 and hosts 408 and 410 of FIG. 4; or another device or module. In transmitting operation 602, an FCoE capable device transmits discovery frames to other FCoE capable devices in a network. In receiving operation 603, the FCoE capable device receives discovery frames transmitted by other FCoE devices in the network. These discovery frames may be transmitted in response to the received discovery frames.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A device, comprising:
an evaluation logic module, being a hardware processor processing a sequence of steps or interconnected circuit-modules, to determine that a duplication condition exists in a network when an L2 source address of a transmitting port in a discovery frame received at a receiving port matches an L2 source address of a port other than the transmitting port known by the receiving port to exist in the network and a unique port identifier of the transmitting port in the discovery frame does not match a unique port identifier of the port other than the transmitting port known by the receiving port.

2. The device according to claim 1, further comprising:
a transmitter which alerts other devices on the network that a duplication condition exists on the network.

3. The device according to claim 1, wherein the port other than the transmitting port known by the receiving port is configured to go offline in the network when a duplication condition exists.

4. The device according to claim 1, wherein the source address of the port other than the transmitting port known by the receiving port to exist in the network was received by the receiving port in a separate discovery frame.

5. The device according to claim 1, wherein the evaluation logic module further determines that a duplication condition exists in the network when the unique port identifier of the transmitting port in the discovery frame matches the unique port identifier of the port other than the transmitting port known by the receiving port and the L2 source address of the transmitting port in the discovery frame does not match the L2 source address of the port other than the transmitting port known by the receiving port.

6. The device according to claim 1, wherein the discovery frame is a solicitation frame or an advertisement frame from a port of an FCoE device.

7. A method of detecting an existence of duplicate addresses in a network, comprising:
determining, by interconnected circuit-modules or by a hardware processor processing a sequence of steps, that a duplication condition exists in the network when an L2 source address of a transmitting port in a discovery frame received at a receiving port matches an L2 source address of a port other than the transmitting port known by the receiving port to exist in the network and a unique port identifier of the transmitting port in the discovery frame does not match a unique port identifier of the port other than the transmitting port known by the receiving port.

8. A method according to claim 7, further comprising:
alerting other devices on the network that a duplication condition exists on the network.

9. A method according to claim 7, further comprising:
taking the port other than the transmitting port known to the receiving port offline in the network when a duplication condition exists.

10. A method according to claim 7, further comprising:
taking the transmitting port and the port other than the transmitting port known to the receiving port offline in the network when a duplication condition exists.

11. A method according to claim 7, wherein the source address of the port other than the transmitting port known by the receiving port to exist in the network was received by the receiving port in a separate discovery frame.

12. A method according to claim 7, wherein the determining a duplication condition exists in the network further comprises determining when the unique port identifier of the transmitting port in the discovery frame matches the unique port identifier of the port other than the transmitting port known by the receiving port and the L2 address of the transmitting port in the discovery frame does not match the L2 address of the port other than the transmitting port known by the receiving port.

13. A method according to claim 7, wherein the discovery frame is a solicitation frame or an advertisement frame from a port of an FCoE device.

* * * * *